(12) United States Patent
Dowling

(10) Patent No.: US 6,647,467 B1
(45) Date of Patent: *Nov. 11, 2003

(54) METHOD AND APPARATUS FOR HIGH PERFORMANCE BRANCHING IN PIPELINED MICROSYSTEMS

(75) Inventor: Eric M. Dowling, Richardson, TX (US)

(73) Assignee: Micron Technology, Inc., Boise, ID (US)

( * ) Notice: Subject to any disclaimer, the term of this patent is extended or adjusted under 35 U.S.C. 154(b) by 285 days.

This patent is subject to a terminal disclaimer.

(21) Appl. No.: 09/685,273

(22) Filed: Oct. 9, 2000

Related U.S. Application Data

(63) Continuation of application No. 08/996,525, filed on Dec. 23, 1997, now Pat. No. 6,157,988.
(60) Provisional application No. 60/054,545, filed on Aug. 1, 1997.

(51) Int. Cl.[7] .............................................. G06F 12/08
(52) U.S. Cl. ...................... 711/140; 711/137; 711/125; 712/207; 712/208; 712/219; 712/239
(58) Field of Search ............................... 711/140, 125, 711/137; 712/207, 208, 239, 219

(56) References Cited

U.S. PATENT DOCUMENTS

| | | | |
|---|---|---|---|
| 3,949,379 A | | 4/1976 | Ball |
| 4,926,323 A | | 5/1990 | Baror et al. |
| 4,942,520 A | * | 7/1990 | Langendorf ................. 711/140 |
| 4,984,154 A | | 1/1991 | Hanatani et al. |
| 4,991,080 A | | 2/1991 | Emma et al. |
| 5,136,696 A | | 8/1992 | Beckwith et al. |
| 5,226,130 A | | 7/1993 | Favor et al. |
| 5,265,213 A | | 11/1993 | Weiser et al. |
| 5,283,873 A | | 2/1994 | Steely, Jr. et al. |
| 5,425,102 A | | 6/1995 | Moy |
| 5,454,117 A | | 9/1995 | Puziol et al. |
| 5,469,552 A | | 11/1995 | Suzuki et al. |
| 5,506,976 A | | 4/1996 | Jaggar |
| 5,604,909 A | * | 2/1997 | Joshi et al. ................. 712/208 |
| 5,734,881 A | | 3/1998 | White et al. |
| 5,740,417 A | | 4/1998 | Kennedy et al. |
| 5,740,418 A | | 4/1998 | Hara |
| 5,754,176 A | | 5/1998 | Crawford |
| 5,793,952 A | | 8/1998 | Limsico |
| 6,157,988 A | | 12/2000 | Dowling |

OTHER PUBLICATIONS

"System 7—MacIntosh Reference Guide", pp. 30–31, 1991.

* cited by examiner

*Primary Examiner*—Hiep T. Nguyen
(74) *Attorney, Agent, or Firm*—Gazdzinski & Associates

(57) ABSTRACT

A pipelined processor includes a branch acceleration technique which is based on an improved branch cache architecture. In one exemplary embodiment, the present invention has an instruction pipeline comprising a plurality of stages, each stage initially containing first data. A branch cache module stores at least a portion of the first data from one or more of the pipeline stages, and a branch cache control unit causes the branch cache module to store at least portion of the first data from one or more of the pipeline stages in response to execution of a cacheable branch instruction which triggers a cache miss, and causes the branch cache module to restore second data to one or more of the pipeline stages in response to a cache hit. The present invention also discloses methods for controlling the branch cache and for reducing pipeline stalls caused by branching.

48 Claims, 9 Drawing Sheets

METHOD AND APPARATUS FOR HIGH PERFORMANCE BRANCHING IN PIPELINED MICROSYSTEMS

REFERENCE TO RELATED APPLICATIONS

The present application is a continuation of U.S. patent application Ser. No. 08/996,525 now U.S. Pat. No. 6,157,988 of the same title, filed Dec. 23, 1997, which claims priority benefit of U.S. provisional application Serial No. 60/054,545, filed Aug. 1, 1997.

BACKGROUND OF THE INVENTION

1. Field of the Invention

This invention relates to the field of microprocessor architectures. More particularly, the invention relates to branch caching and pipeline control strategies to reduce branching delays in multi-issue processors, especially very long instruction word (VLIW) digital signal processors (DSPs).

2. Description of the Related Art

Most processors, such as microprocessors, media processors, Digital Signal Processors (DSPs), and microcontrollers, employ one or more pipelines to allow multiple instructions to execute concurrently. In a pipeline, processor instruction execution is broken down into a sequence of sub-instruction phases (also known as pipeline stages). The clock rate of the processor is usually determined by the timing of the slowest phase. The processor clock rate can be increased by breaking an instruction down into many short stages, each of which can be executed very quickly. The pipeline stages are typically buffered so that in an N-stage pipeline, N stages from N sequential instructions can execute concurrently. When operating at peak capacity, during each clock cycle the pipeline is able to start the first stage of a new instruction while completing the final stage of the oldest instruction in the pipeline. This provides an effective peak pipeline throughput of one instruction per clock.

Multi-issue processors, such as those employing superscalar and VLIW architectures, can fetch multiple instructions per clock cycle and dispatch multiple instructions to multiple pipelines during each clock cycle. Thus, a processor with M pipelines can execute M instructions per clock. Use of many pipelines increases the number of instructions that can be executed per clock. Use of long pipelines, having shorter stages, allows faster clock rates. The fastest processors are those processors that have many long pipelines.

While each pipeline can deliver a peak throughput of one instruction per clock, it is the average number of instructions per clock that determines the total processor throughput during actual program execution. Especially in real-time applications such as multimedia and digital signal processing, the throughput of the processor executing a specific application code determines the performance, cost, and operability of a system. Hence, it is important to consider program execution and its effect on pipeline operation.

Pipeline performance is limited by a number of conditions, called "hazards," that arise in program execution, as discussed in "Computer Architecture: A Quantitative Approach, 2nd Ed." by John Hennessy and David Patterson (Morgan Kaufmann Publishers, 1996). Three types of pipeline hazards exist: structural hazards; data dependency hazards; and control hazards. Hazards in the pipeline make it necessary to "stall" the pipeline. A pipeline stall occurs when the pipeline cannot accept a new instruction into the pipeline. A structural stall is said to occur if two different instructions at two different stages in the pipeline contend for the same hardware resource. A data dependency stall is said to occur if one instruction in the pipeline requires input data that is output from another instruction in the pipeline, and the output data is not yet ready. A control stall is said to occur if a branch, interrupt, or exception modifies the control flow of a program. A pipeline stall creates one or more bubbles, or empty slots in the pipeline. A control stall often causes many pipeline bubbles by causing the entire pipeline to be flushed. While structural and data dependency stalls can be dealt with according to prior art methods, control stalls remain more of a problem, especially in modem superscalar and VLIW systems with long pipelines.

While it is fairly easy to keep the pipeline full during sequential program operation, it becomes much more difficult to maintain pipeline throughput when a branch instruction changes the control flow in a program. This difficulty exists because the branch instructions are not typically resolved until later stages in the pipeline, and while the branch instruction makes its way through the pipeline, instructions in the pipeline may or may not be executed following the branch. When a branch is not taken, the next instruction executed after the branch is called the "fall-through" instruction and the address of this instruction is called the fall-through address. When a branch is taken, the next instruction executed after the branch is called the "branch target" (target) instruction and the address of this instruction is called the target address. Branches are problematic because, when the unresolved branch instruction enters the first stage of the pipeline, the prefetch unit does not have enough information to know whether the next address will be the fall-through address or the target-address. Thus, the prefetch unit cannot fetch the next instruction, because it does not know which instruction will be executed next. In many cases, the prefetch unit will fetch the fall-through address (assume branch is not taken), and if the branch is taken, the processor will simply flush the pipeline and accept the time penalty. Since branch instructions typically account for approximately 20% of all instructions executed, this penalty can be severe.

There are several prior art techniques that attempt to address the pipeline stall problem. A first method, as described in U.S. Pat. No. 4,200,927, appears to use a plurality of instruction prefetch buffers and speculatively decodes instructions from both the fall-through address and the target address. The speculatively decoded instructions are then sent to an instruction queue that feeds the execution unit. When the execution unit resolves the direction of the branch path, the instructions from the path not taken are flushed from the queue. This approach cannot be applied to modem pipelines that execute one instruction per clock cycle because this approach relies on the fact that the execution unit is a microprogrammed state machine and requires multiple clock cycles to execute instructions. The lag time provided by multi-cycle operation allows the prefetch unit and the instruction decoder ample time to concurrently process more than one instruction stream. Modem processors include multiple pipelined execution units that operate at substantially the same speed as the prefetch unit and decoder. Hence, this technique is not applicable to modem systems.

Another prior art technique is speculative execution. Speculative execution uses a branch cache, also called a branch target buffer, and two execution units. The branch target buffer holds the branch target address to be forwarded to the prefetch unit and also holds a sequence of target instructions. When a branch is encountered, the branch target address is obtained from the branch target buffer and a second instruction stream is fetched from the branch target address. A separate pipeline is provided to allow both the fall-through instruction stream and the target instruction stream to be processed concurrently. This technique has the advantage that the control stall is completely removed, regardless of whether the fall-though or target path is eventually selected. While this technique avoids the delay due to a stall, it requires considerable additional hardware, including a branch cache, control hardware, a second pipeline, and a second execution unit. This additional hardware may be prohibitively expensive, especially for superscalar and VLIW processors. Superscalar and VLIW processors employ M pipelines and M multiple execution units, so that speculative execution requires a total of 2M pipelines and 2M execution units. In DSPs, some of these execution units are hardware multipliers that require a significant amount of chip area. Further, the speculative execution approach does not take advantage of any inefficiencies in instruction dispatch that may arise in multi-issue program execution due to data dependencies. Hence, the application of this technique is not practical since it would require a very large chip. Even when technology progresses to allow twice as much hardware to be integrated onto a single chip, that extra area would be put to better use by increasing the amount of on-board memory or by adding more execution pipelines.

Still another approach to dealing with control hazards is to use a branch prediction strategy. In branch prediction, a branch cache is used to monitor the most recently taken branches and to keep track of which way the branch has most often gone in the past. Based on past history, the most likely branch path is predicted and fetching begins from the predicted path. The branch cache will generally contain branch history information as well as the precomputed target address, and, in some cases, will contain one or more target instructions. This approach is more applicable to standard microprocessors and controllers, and is less applicable to VLIW processors. VLIW processors fetch very long instruction words (VLIWs) (also called fetch packets) which may contain many sub-instructions located in different fields of the VLIW. A group of sub-instruction fields issued to a set of pipelines simultaneously is known as an "execute packet." In some systems, the VLIW processor can take up to four pipeline stages just to bring the instruction into the prefetch buffer. If branch prediction is used in such a system, a correctly predicted branch will still cause a minimum of four cycles to be wasted. Further, if the prediction is incorrect and the stages are not buffered, then a branch stall occurs. Often the stall due to a mis-prediction is longer than a normal stall because a mis-prediction may invalidate various lines in the instruction cache and the data cache and thereby cause increased overhead due to cache misses. If the branches in the program are not predictable, then branch prediction may actually hamper performance due to cache miss overhead.

Branch prediction has other problems that limit its use in VLIW processors. VLIW processors execute looped code that is optimized using loop unrolling techniques whereby several loop iterations are unrolled into one macro-loop iteration. The branches in the looped code are highly predictable because the branch target instructions will be executed in all but the final iteration of the loop. This end condition is effectively dealt with by using a conditionally executed branch instruction. VLIW processors typically employ "delayed branch" instructions whereby instructions that fill the pipeline immediately after the branch are allowed to conditionally execute. The delay slots behind the delayed branch can be effectively put to use in predictable inner-loop processing by filling the delay slots with target instructions. This same delayed branch technique can be used to improve performance of unconditional branches, such as subroutine calls and returns, simply by inserting the branch instruction several cycles ahead of where it will actually be executed. However, delayed branch techniques do not work well on a VLIW when dealing with data-dependent conditional branches. Some data-dependent conditional branches can be avoided by using conditionally executed instructions, but this technique wastes hardware resources and thus reduces throughput.

SUMMARY OF THE INVENTION

The present invention solves these and other problems by providing a pipeline architecture with a branch caching structure that reduces or eliminates pipeline stalls regardless of whether the fall-through or the target instruction is to be executed. The present architecture is hardware efficient and involves simple parallel operations that can be performed in a short clock cycle. The present architecture is useful for reducing branch related delays in a wide variety of processor architectures, including superscalar and VLIW processors with multiple pipelines and processors with long or short instruction fetch related pipeline stages. A further aspect of the present invention is a pipeline architecture and branch caching technique capable of handling the unpredictable branches that cannot be handled using loop unrolling and delayed branching in VLIW systems.

A further aspect of the present invention is a modified pipeline that allows branch instructions to be cached so that when a branch occurs, the pipeline stages that would otherwise have stalled, can be filled from the branch cache, thereby avoiding the stall. Yet another aspect of the present invention is to provide hardware to allow branch instructions to be detected early in the instruction pipeline, thereby providing time for the branch cache to operate in processors with very high clock rates. Another aspect of the present invention is an integrated pipeline, branch cache, and control structure that allows the processor to service branch cache misses without adding extra delay cycles. Another aspect of the present invention is an integrated pipeline, branch cache, and control structure that allows the processor to store data needed to service cache hits without incurring any delay cycles after the branch. Still another aspect of the present invention is an integrated pipeline, branch cache, and control structure that allows the processor to respond to cache hits while reducing the amount of branch cache space used to service cache hits without incurring delay cycles after the branch. Another aspect of the present invention is a multi-level branch cache structure which allows a reduced number of prefetch buffers to be stored for a given number of cache tag entries. Still another aspect of the invention is a control strategy that allows a pipeline to fill from the program cache when a target instruction would normally stall the pipeline.

Another aspect of the present invention is a method in a pipelined processor for reducing pipeline stalls caused by branching. The method comprises the steps of prefetching instructions into a first stage of the pipeline and propagating instructions into one or more subsequent stages of the pipeline. A conditional outcome is computed in one of the subsequent stages. Concurrently with processing at a specified stage in the pipeline, one or more instruction op-codes are analyzed to determine whether a cacheable branch instruction is present, and, if the branch instruction is present, a tag relating to the branch instruction is sent to a branch cache. The method includes the further steps of determining, in response to the conditional outcome, whether a branch is to be taken, and, if the branch is to be taken, sending a branch taken signal to the branch cache. If the conditional outcome indicates a branch is not to be taken, the method continues to fetch instructions into the pipeline and to execute the instructions. On receipt of the current branch tag, the branch cache performs the steps of examining a collection of stored branch tags to find a stored branch tag which matches the current branch tag. If the current branch tag is not found in the collection of stored branch tags and the branch is to be taken, the method signals a cache miss and causes the pipeline to fill one or more designated pipeline stages starting at a branch target address. The designated pipeline stages are pipeline stages that stall according to the branch. The branch cache stores the current branch tag and one or more instructions contained within the designated pipeline stages. If the branch taken signal is received and the current branch tag is found in the collection of stored branch tags, the method signals a cache hit and sends a branch target address to the prefetch unit so that instruction fetching can proceed from the branch target address. The method provides data stored in the cache to one or more of the designated pipeline stages so that execution can continue without delay irrespective of the conditional outcome.

Another aspect of the present invention is a computer processor which comprises an instruction pipeline comprising a plurality of stages. Each stage contains pipeline data. A branch cache comprises a plurality of cache lines. Each cache line comprises a stored branch tag and stored cache data. A branch cache controller is configured to detect a cacheable branch instruction in one of the pipeline stages. The branch cache controller receives a current branch tag from one of the pipeline stages. The branch cache controller receives conditional information indicative of whether the branch shall be taken. The branch cache controller attempts to match the current branch tag to a stored branch tag for a first cache line. If the branch is to be taken, the branch cache controller signals a cache miss when the attempt to match fails and signals a cache hit when the attempt to match succeeds. In response to the cache miss, the branch cache controller stores the current branch tag in the branch tag location of a designated cache line. The branch cache controller further stores data from one or more of the pipeline stages which stall in response to the cacheable branch instruction. The data from the stalled pipeline stages are stored in the cache data location of the designated cache line. In response to the cache hit, the branch cache controller loads one or more of the pipeline stages from the stored cache data to avoid a pipeline stall from the cacheable branch instruction.

Another aspect of the present invention is a computer processor which comprises an instruction pipeline which comprises a plurality of stages. Each stage contains data. The processor includes means for storing data from one or more of the pipeline stages and for restoring data to one or more of the pipeline stages. The processor further includes means for controlling the means for storing. The means for controlling causes the branch cache to store data from one or more of the pipeline stages in response to execution of a cacheable branch instruction which triggers a cache miss. The means for controlling also causes the means for storing to restore data to one or more of the pipeline stages in response to a cache hit, thereby avoiding pipeline stalls when a cache hit occurs.

Another aspect of the present invention is a method in a pipelined microsystem such as a microprocessor, DSP, media processor, or microcontroller. The method is a method to load branch instruction information into a branch cache so as to allow the branch instruction to execute subsequently with a reduced or eliminated time penalty by minimizing the amount of information to be cached. The method comprises the step of: monitoring the instruction stream in a dispatch unit in a pipeline stage to detect whether a branch instruction of a selected type is present. When the branch instruction is detected, the method signals to a branch cache control unit that the instruction is present. The method makes available at least a portion of an address of the branch instruction to the branch cache control unit. The method compares the portion of the address of the branch instruction to a set of cache tags containing branch instruction address related information. When the branch instruction does not match any tag, the method fills the branch cache entry so that, when the branch instruction is next encountered, the tag will match and the branch target stream can proceed without delay. When program execution makes a branch target fetch packet available to be cached to allow the target instruction stream to execute to a target prefetch buffer, the method loads data from the target prefetch buffer into a position in the branch cache line associated with the branch instruction and sets a counter to a prespecified number, d, corresponding to the maximum possible number of fetch packets that may need to be cached. The method decrements the counter on each subsequent cycle. The method loads subsequent fetch packets from the target instruction stream into the branch cache line only when they are fetched. The method exits the branch cache fill operation when the counter has decremented to a specified number such that the branch cache line is filled with the appropriate number of target prefetch packets that are fetched in the first d time slots when the target instruction stream is executed. Preferably, the method includes the further step of loading stall override bits into the branch cache line. The stall override bits indicate for each of the d cycles whether or not the branch cache will supply the target fetch packet during a given cycle. Also preferably, the method includes the further step of storing a condition field to indicate a register or an execute stage which supplies the conditional branch information so that the branch cache can resolve the branch early. Also preferably, the method includes the step of supplying an auxiliary link field which points to a next prefetch buffer of the cache line. The auxiliary link field creates a linked list in a variable-length cache line structure. Preferably, the method further includes the step of caching shadow dispatch unit pre-evaluation data to allow a shadow dispatch unit to dispatch instructions using less hardware than the dispatch unit.

Another aspect of the present invention is a method for a pipelined microsystem such as a microprocessor, DSP, media processor, or microcontroller. The method services branch cache hits so as to reduce or eliminate cycle loss due to branching. The method comprises the step of monitoring the instruction stream in a pipeline stage to detect whether a branch instruction of a selected type is present. When the branch instruction is detected, the method signals to a branch cache control unit that the instruction is present. At least a portion of an address of the branch instruction is made available to the branch cache control unit. The method further includes the step of comparing the portion of the address of the branch instruction to a set of tags containing branch instruction address related information. When the branch instruction does match a tag and the branch is evaluated to be taken, the method performs the steps of reading a target prefetch buffer out of the branch cache and supplying the target prefetch buffer to a shadow dispatch unit. The prefetch buffer is dispatched from the shadow dispatch unit to a multiple execution pipeline in units of execute packets. Instructions are prefetched at a full prefetch rate irrespective of whether multiple cycles are required to dispatch a fetch packet. The prefetching of instructions continues at a full prefetch rated until early pipeline stages catch up to later pipeline stages. As a result, the target instruction stream proceeds at full speed and only a minimum number of fetch packets needed to support full speed execution are fetched from the branch cache.

Another aspect of the present invention is method for a pipelined microsystem such as a microprocessor, DSP, media processor, or microcontroller. The method services branch cache hits so as to reduce or eliminate cycle loss due to branching. The method comprises the step of monitoring the instruction stream in a pipeline stage to detect whether a branch instruction of a selected type is present. When the branch instruction of a selected type is detected, the method signals to a branch cache control unit that the instruction is present, and makes at least a portion of the branch instruction's address available to the branch cache control unit. The method includes the further step of comparing the portion of an address of the branch instruction to a set of tags containing branch instruction address related information. When the branch instruction does match a tag and the branch is evaluated to be taken, the method performs the step of reading the target prefetch buffer out of the branch cache. The contents of the target prefetch buffer are supplied to a multiplexer which routes the contents of the target prefetch buffer back to the dispatch unit. The contents of the target prefetch buffer are dispatched to the pipeline in units of execute packets. Instructions are prefetched by the pipeline at full speed, irrespective of whether it takes multiple cycles to dispatch a fetch packet, until the early pipeline stages catch up to the later pipeline stages. As a result, the target instruction stream proceeds at nearly full speed, and only a minimum number of fetch packets needed to support full speed execution are fetched from the branch cache.

Another aspect of the present invention is a method for a VLIW processor which fetches groups of instructions in fetch packets and dispatches subsets thereof as execute packets in one or more clock cycles. The method reduces the size of a branch cache which buffers branch target information. The method comprises the steps of caching the target prefetch buffer when a branch cache miss is detected; and caching a variable number of immediately following prefetch buffers. The number of cached prefetched buffers is the number of prefetch buffers that are fetched in the target instruction stream during the first d cycles of execution, where the number d is related to the number of pipeline stages that would otherwise stall when a branch occurs.

Another aspect of the present invention is a branch cache to be used in a multi-issue processor having an address generate portion in a prefetch unit. The processor dispatches in each clock cycle variable numbers of instructions contained in each fetch packet. The cache comprises a plurality of lines. Each line comprises a tag field which holds information relating to the addresses of branch instructions. The information includes address information of branch instructions of a selected type or types. Each cache line also comprises a branch address field which holds an address near to the branch target address, so that this near address can be forwarded to the program address generate portion of the prefetch unit for target instruction stream fetching. A prefetch buffer field in each cache line holds the first prefetch buffer of the target instruction stream. At least one link field in each cache line indicates whether more prefetch buffers are associated with the tag field. At least one extra prefetch buffer field is provided in each cache line. Preferably, the number of extra prefetch buffer fields is determined by initial prefetch activity of the target instruction stream. Also preferably, each cache line additionally comprises a pipeline stall override field which signals the prefetch unit to continue to fetch instructions when there would otherwise be a pipeline stall due to multiple execute packets being dispatched from a single target fetch packet. Also preferably, additional prefetch buffers of the cache line are arranged in a linked list structure.

Another aspect of the present invention is a method to fill an instruction pipeline after a branch instruction is detected which selects a target instruction stream. The method comprises the steps of reading a prefetch buffer out of the branch cache line associated with the instruction which caused the branch cache hit; sending the cached prefetch buffer to a shadow dispatch unit; routing the output of the shadow dispatch unit to a multiplexer which selects instruction information from a dispatch unit in the execution pipeline or from a shadow dispatch unit; providing a select signal which forces the multiplexer to select the cached fetch packet from the shadow dispatch unit; forwarding the fetch packet to decoder stages of an execution pipeline in units of execute packets; allowing the prefetch stages of the instruction pipeline to continue functioning irrespective of how many execute packets are in each fetch packet until the instruction pipeline is filled; and supplying the requisite number of fetch packets from the branch cache to allow the target instruction stream to proceed without adding extra delay cycles.

Another aspect of the present invention is a method to fill an instruction pipeline after a branch instruction is detected which selects a target instruction stream. The method comprises the steps of reading a prefetch buffer out of the branch cache line associated with the instruction which caused the branch cache hit; sending the cached prefetch buffer to a dispatch unit; routing the output of the shadow dispatch unit to decoder stages of an execution pipeline in units of execute packets; allowing the prefetch stages of the instruction pipeline to continue functioning irrespective of how many execute packets are in each fetch packet until the instruction pipeline is filled; and supplying the requisite number of fetch packets from the branch cache to allow the target instruction stream to proceed without adding extra delay cycles.

Another aspect of the present invention is a method to detect and control the branch cache related processing of branch instructions in processing systems comprising a first cacheable branch instruction type and a second non-cacheable branch instruction type. The method comprises the step of evaluating bits located in an instruction that passes through a selected stage of an instruction pipeline to determine whether the instruction corresponds to a cacheable branch instruction. If the instruction corresponds to a cacheable branch instruction, the method performs the step of evaluating a condition and a tag associated with the instruction to determine whether data needs to be read out of a branch target buffer. If the instruction is not a branch instruction or is a non-cacheable branch instruction, the method continues processing of the instruction and aborts any subsequent branch cache processing for the instruction.

Another aspect of the invention is a pipelined processor which includes a branch acceleration technique which is based on an improved branch cache. The improved branch cache minimizes or eliminates delays caused by branch instructions, especially data-dependent unpredictable branches. In pipelined and multiply pipelined machines, branches can potentially cause the pipeline to stall because the branch alters the instruction flow, leaving the prefetch buffer and first pipeline stages with discarded instructions. This has the effect of reducing system performance by making the branch instruction appear to require multiple cycles to execute. The improved branch cache differs from conventional branch caches. In particular, the improved cache is not used for branch prediction, but rather, the improved branch cache avoids stalls by providing data that will be inserted into the pipeline stages that would otherwise have stalled when a branch is taken. Special architectural features and control structures are supplied to minimize the amount of information that must be cached by recognizing that only selected types of branches should be cached and by making use of available cycles that would otherwise be wasted. The improved branch cache supplies the missing information to the pipeline in the place of the discarded instructions, completely eliminating the pipeline stall. This technique accelerates performance, especially in real-time code that must evaluate data-dependent conditions and branch accordingly.

BRIEF DESCRIPTION OF THE FIGURES

The various novel features of the invention are illustrated in the figures listed below and described in the detailed description which follows.

DETAILED DESCRIPTION OF THE PREFERRED EMBODIMENT

Figure 1:
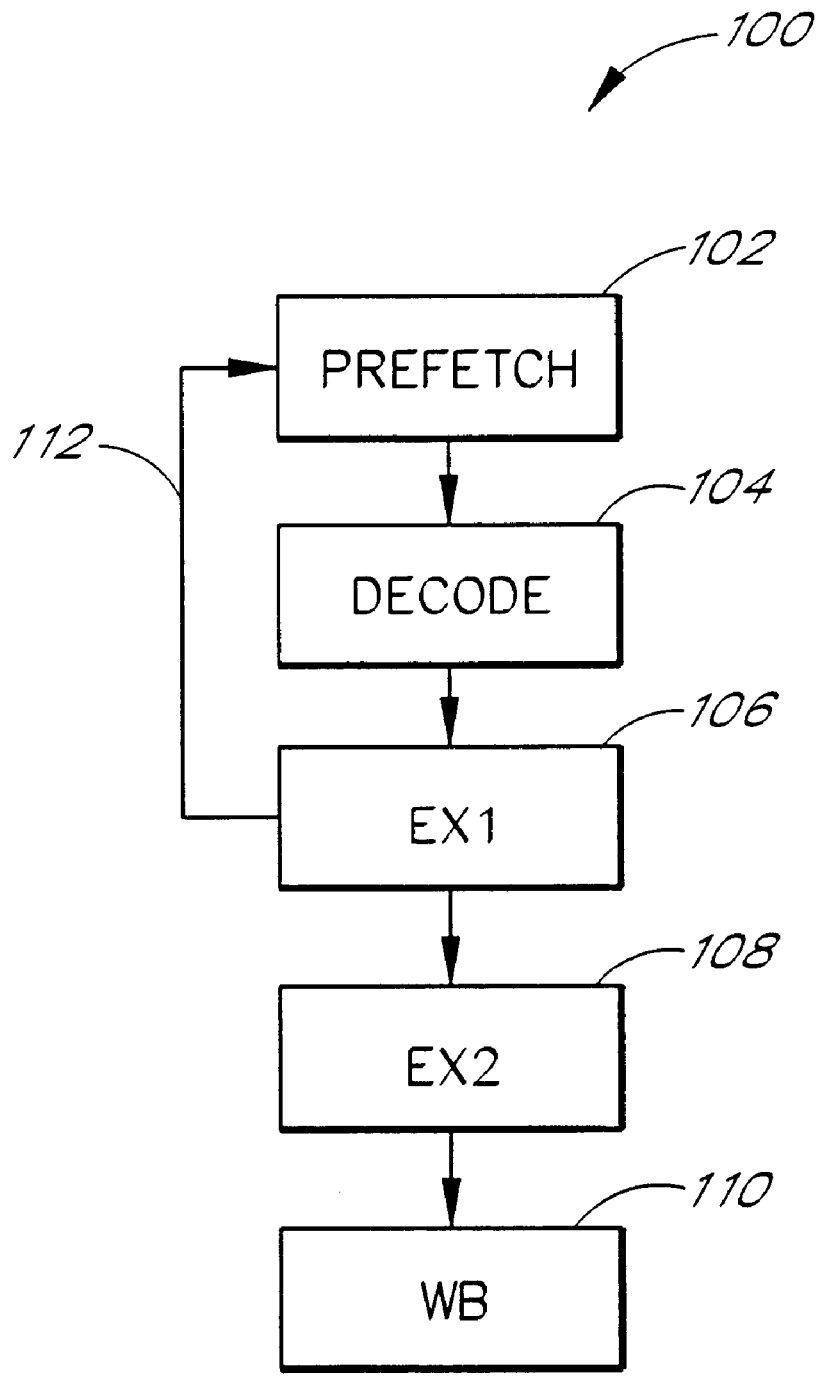
FIG. 1 is a block diagram that illustrates a prior art single issue load-store processor pipeline.

FIG. 1 is a block diagram that illustrates a conventional microcomputer pipeline 100 as would be found a Reduced Instruction Set Computer (RISC) or a Digital Signal Processor (DSP) employing a single issue load-store architecture. A first input of a first pipeline stage 102 receives instructions fetched from a program stored in memory or program cache. The prefetch stage 102 includes a prefetch buffer together with a program counter and next instruction address generation hardware. A decode stage 104 receives input from the prefetch stage 102 and provides decoded instruction data to a first execute stage (EX1) 106. The first execute stage 106 provides partial results to a second execute stage (EX2) 108. The first execute stage 106 also provides branch data to a second input of the prefetch stage 102 over a feedback path 112. The second execute stage 108 provides final results to a write-back stage (WB) 110. Different processor pipelines may have different numbers of execute stages, and some processors may use different numbers of execute states for different instructions. The write-back stage may be incorporated into the last used execute stage.

The feedback path 112 from the first execute stage 106 back to the prefetch stage 102 is used to send a branch address calculated in the first execute stage 106 back to the prefetch stage 102. The branch address is commonly computed in the first execute stage 106 by adding an offset to the address of a branch instruction. The branch target address is not known to the prefetch stage 102 until two cycles after the branch instruction has been fetched. Thus, two instructions enter the pipeline that will be discarded if the branch target is selected. The two instructions are discarded from the prefetch stage 102 and the decode stage 104. If the branch fall-through address is selected, then the pipeline 100 properly contains the next instructions to be executed. If the branch target is selected, the fall-through instructions in the prefetch stage 102 and the decode stage 104 are flushed from the pipeline. If the branch can be accurately predicted, as in looped code, then branch prediction can minimize the number of unused delay slots that are encountered after a branch.

Figure 2:
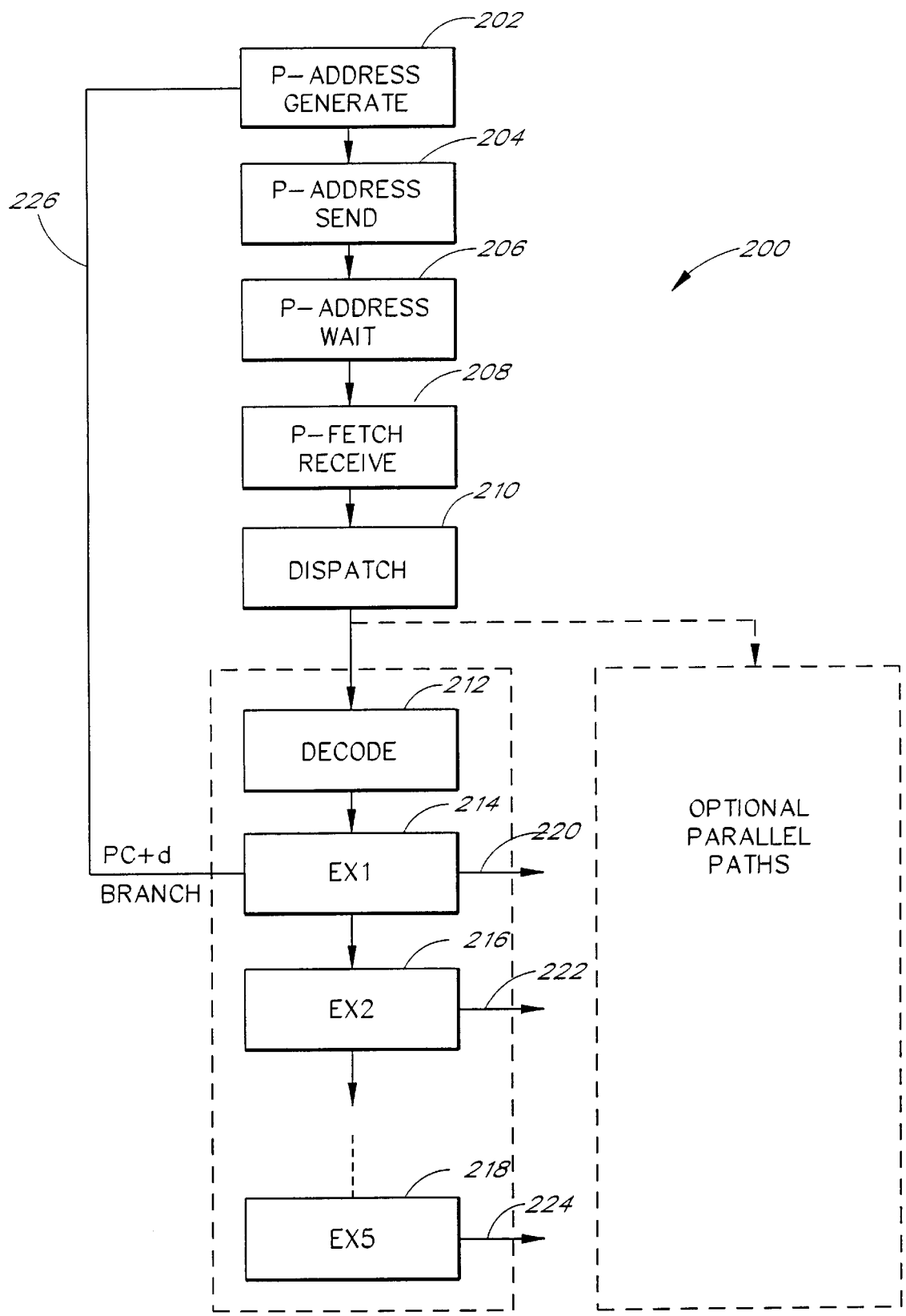
FIG. 2 is a block diagram that illustrates a typical prior art VLIW pipeline incorporating multiple prefetch stages.

FIG. 2 illustrates a prior art multi-issue pipeline 200 which is similar to that found on VLIW DSPs such as the TMS320C62xx processors from Texas Instruments, Inc. In the pipeline 200, instructions are broken into many smaller stages to allow the system clock rate to be increased, resulting in a comparatively deep pipeline. The pipeline 200 includes a program address generation stage (P-ADDRESS GENERATE) 202 which provides a program address to a program address send stage (P-ADDRESS SEND) 204.

The program address send stage 204 provides its output to a program access wait stage (P-ADDRESS WAIT) 206. The output of the program access wait stage 206 is a prefetch packet which is received by a program fetch receive stage (P-ADDRESS RECEIVE) 208. The output of the program fetch receive stage 208 is a previous fetch packet which is provided to a dispatch stage 210. The dispatch stage 210 outputs a group of instructions from the fetch packet to one or more decode stages, including a decode stage 212 as shown in FIG. 2. A group of instructions dispatched concurrently from a fetch packet is called an execute packet. The issue of instructions from the dispatch stage 210 to the decode stages represents a forking of the pipeline into a plurality of parallel paths, only one of which is shown in FIG. 2 (the path shown comprises the blocks 212, 214, 216, and 218). In FIG. 2 the decode stage 212 provides a decoded instruction to a first execute stage (EX1) 214. The first execute stage 214 either writes its output over a data path 220 to one or more registers, or provides partial results to a second execute stage (EX2) 216. Branch target addresses calculated in the first execute stage 214 are routed over the feedback path 226 to the program address generation stage 202. Partial results received in the second execute stage 216 are further processed. The second execute stage 216 provides output on a data path 222. If the instruction involves more stages, a further processed set of partial results is propagated down to a cascade of one or more subsequent execute stages until, for example, a fifth execution stage (EX5) 218 is reached. Output from the fifth execute stage 218 is provided on a data path 224.

A potential stall of the pipeline 200 may occur when a branch target instruction is selected by a branch instruction that computes the branch target address in the first execute stage 214. Assuming one fetch packet is processed per cycle, five cycles worth of instruction fetching, decoding and dispatching are potentially wasted. Stated differently, when the first execute stage 214 forces a branch to a branch target address, then the data in the stages 210, 208, 206, 204 and 202 become invalid and must be flushed (because the invalid data was fetched according to the branch fall-through address). If the branch is predictable, as in a fixed inner-loop, loop unrolling techniques combined with the use of delayed branches can be employed to insure that the five fetch packets following the branch contain useful instructions that will be executed for all passes but the final pass through the inner-loop. However, outer loops cannot be processed as efficiently, with the result that the five cycles following the branch may be wasted. When the pipeline 200 executes code with data-dependent conditional branching, five cycles will often be wasted because data-dependent control structures and data dependencies prevent the effective use of delayed branching. Thus, the pipeline 200 will not be effective in handling branching due to outer loops and data-dependent (unpredictable) conditional branching because the predictions will often be wrong, and the time penalty associated with a mis-predicted branch will be five cycles or more.

Comparing FIG. 2 to FIG. 1 illustrates some of the differences between the prior art systems. Newer high performance VLIW pipelines, as shown in FIG. 2, are much deeper, resulting in a more severe penalty for data dependent branches that select the target instruction (in other words, data dependent branches where the branch is taken). In these data dependent situations, branch prediction is less effective, and thus, NOPs ("no operation" instructions) are often inserted after the branch, thereby reducing performance if the branch is not taken. The present invention provides architectural advancements to improve performance of the processor operating on unpredictable, data-dependent, branches.

Figure 3:
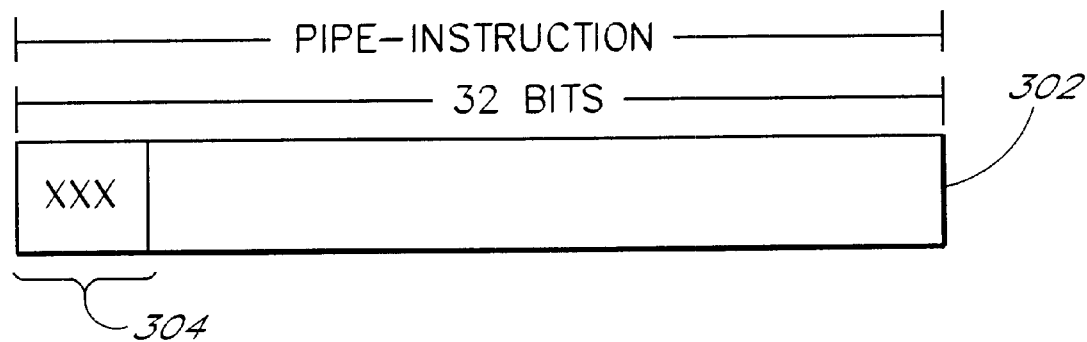
FIG. 3 is a block diagram that illustrates an instruction op-code field and logic responsive to the field to provide early branch indication.
Figure 3:
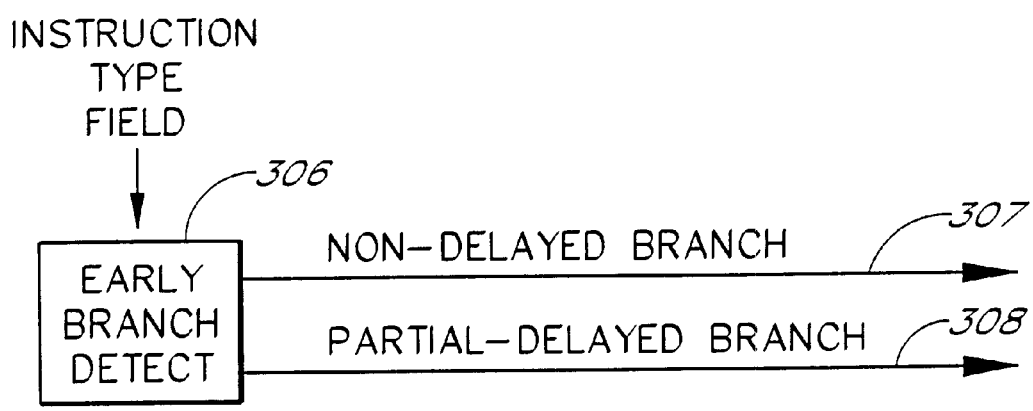

In accordance with a preferred embodiment of the present invention, FIG. 3 illustrates instruction coding and associated early branch detection circuitry. The fetch packet includes one or more instructions that will be dispatched to the appropriate pipelines for decoding and execution. FIG. 3. shows a 32-bit instruction op-code 302 held within a fetch packet. One or more bits in a field 304 within the op-code 302 indicates the type of instruction represented by the op-code. This field of bits is provided to an early branch detection circuit 306. The early branch detect circuit 306 provides a first output signal 307 which signals the presence of a non-delayed branch. The early branch detect circuit 306 may also provide a second output signal 308 which signals the presence of a partially-delayed branch. A partially delayed branch is a branch instruction whose target address is within the pipeline. For example, using the early branch detect circuit 306, data-dependent conditional branches can be treated differently than delayed branches that are already coded for efficient execution.

The early branch detection circuit 306 is preferably implemented using parallel and/or logic compare circuitry. Prior art dispatch unit hardware already checks the op-code to determine to which functional unit the instruction will be dispatched. With the circuitry of the current invention, the dispatch unit further checks to see if any of the instructions are the selected branch instructions. According to an aspect of the present invention, the early branch detect circuit 306 detects the selected branch instructions early and deals with them separately from the well used branch instructions. This greatly reduces the necessary size of the branch cache. Smaller branch caches require less silicon area and are able to look up results in a shorter clock cycle.

In other embodiments, a single delayed branch type of branch instruction can exist, and the early branch detect circuit 306 checks for the presence of NOPs after branch instructions to determine if branch cache pipeline processing is needed.

Figure 4:
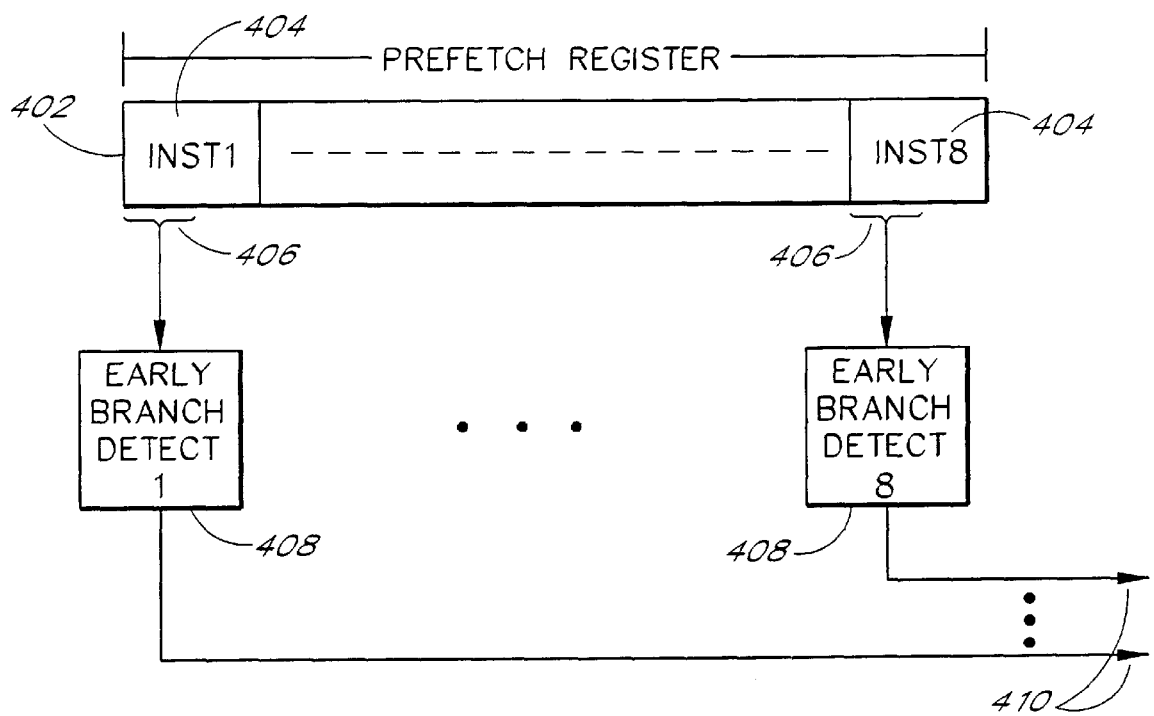
FIG. 4 is a block diagram that illustrates multiple op-code fields in a fetch packet, and logic responsive to the fields to provide early branch indication.

FIG. 4 shows a higher level view of the early branch detection logic as implemented in the dispatch stage 210 of the pipeline 200. A prefetch register 402 holds a set of one or more instructions 404. Each of these instructions 404 preferably includes a bit field 406 indicative of the instruction type. This field of each instruction is interpreted by a respective early branch detection circuit 408. Each early branch detection circuit 408 preferably asserts its respective output at the beginning of the cycle in which the branch instruction is dispatched. Earlier indication can be provided in some embodiments to give the branch cache more time to look up results. In some embodiments, early indication circuitry is provided in the program fetch receive stage 208. The early indication circuitry provides an early trigger, thus giving the branch cache extra time. The early branch detection circuits 408 output their results on lines 410 to a branch cache and pipeline control logic block (not shown).

Figure 5:
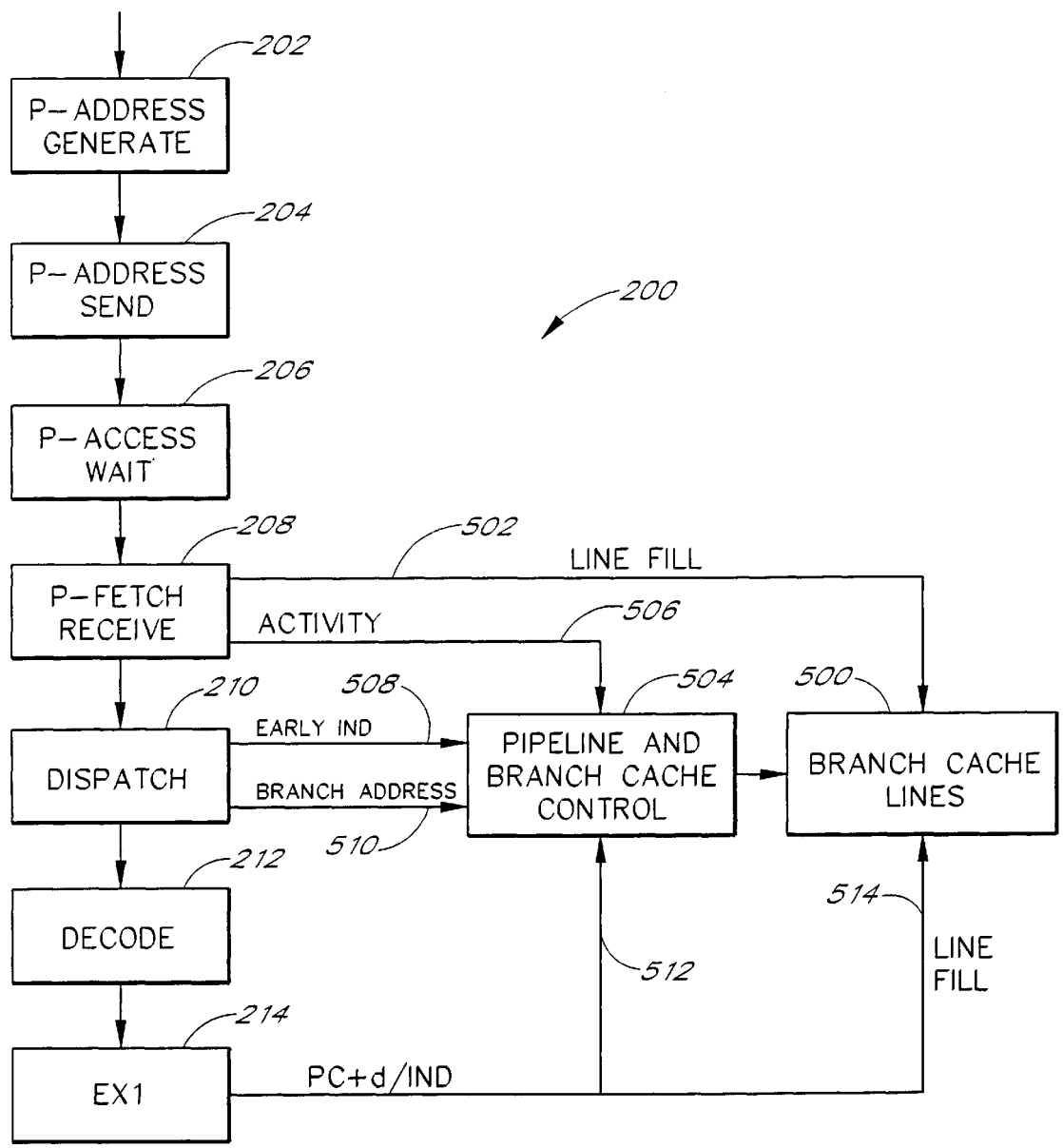
FIG. 5 is a block diagram that illustrates a structure of the pipeline, pipeline control logic, and a branch cache used to detect and respond to a branch cache miss.

FIG. 5 illustrates the pipeline structure of a preferred embodiment that supports branch cache misses (processing of branch cache hits is explained in connection with FIG. 7). While the invention is applicable to various pipeline configurations, the first seven stages of the pipeline 200 are the stages 202, 204, 206, 208, 210, 212 and 214 as in FIG. 2. Hardware is added to some of these stages to implement the present invention. For example, the program fetch receive stage 208 is modified to provide a line fill output to a branch cache 500 on a line 502. An activity strobe 506 is routed from the program fetch receive stage 208 to a pipeline and branch cache control logic block 504 (hereinafter the "control logic 504"). The dispatch stage 210 is advantageously modified by supplying the hardware of FIG. 4 to provide an early branch indication time strobe (EARLY IND) to the control logic 504 on a line 508. In the preferred embodiment, the line 508 is strobed for each selected branch instruction in the fetch packet at the beginning of the cycle in which it is dispatched. At substantially the same time, at least a part of the address of the branch instruction causing the branch cache miss is supplied to the control logic 504 on a line 510. When the branch instruction is subsequently executed in the first execute stage 214, the branch target address (PC+d/IND) is supplied to the control logic 504 on a line 512 and to the branch cache on line 514. In an alternative embodiment, when the branch target address is found to be already in the pipeline, the control logic 504 may elect to modify the prefetch address as discussed below.

Figure 6:
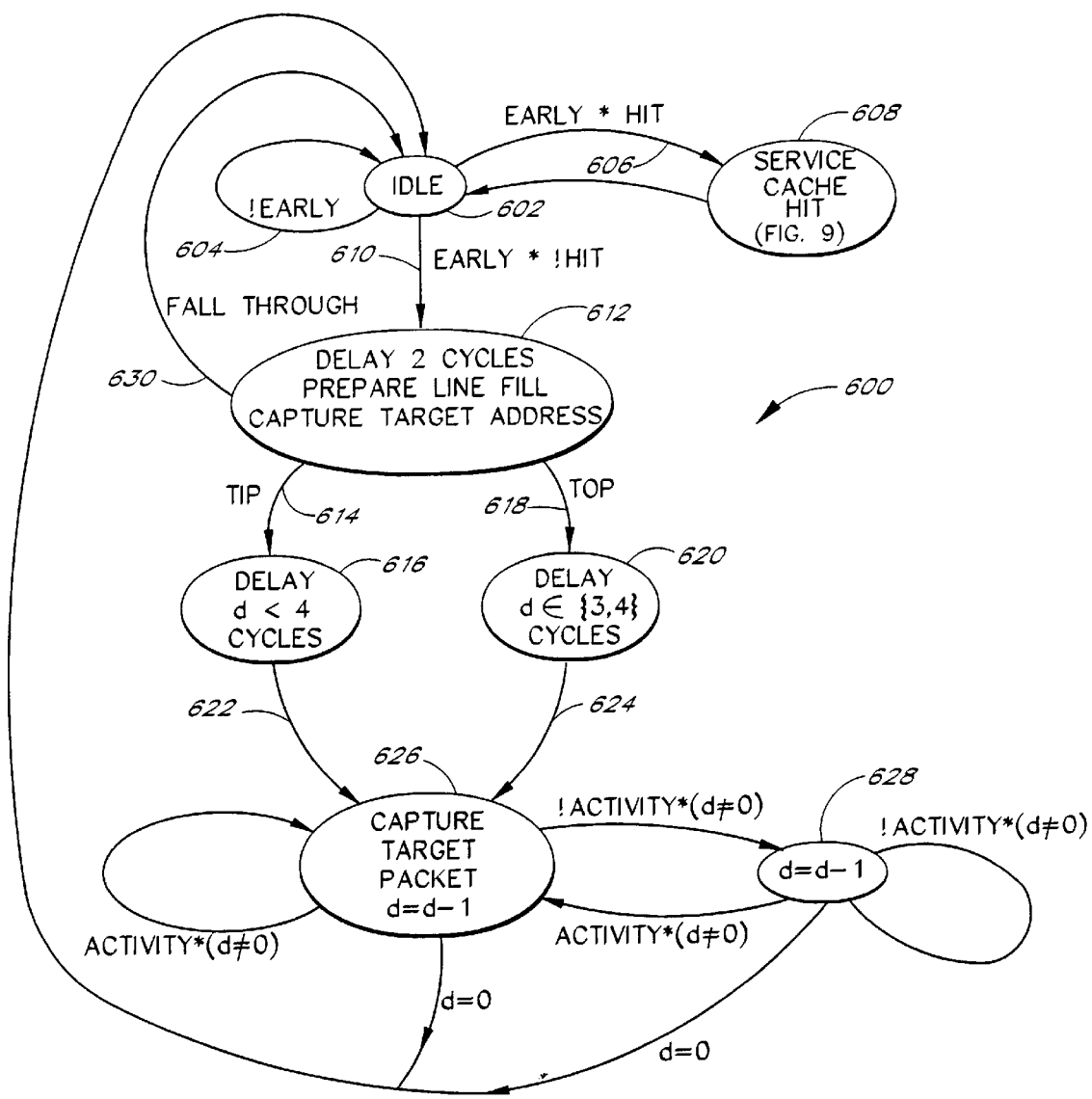
FIG. 6 is a state diagram that illustrates one embodiment of the sequential logic of the pipeline and branch cache control logic used to detect and respond to a branch cache miss.

FIG. 6 is a state diagram of the operation of a state machine 600 that illustrates the operation of the pipeline shown in FIG. 5 when a cache miss occurs in the branch cache 500. The state machine 600 represents an embodiment of the sequential control logic contained in the control logic block 504, and thus will be discussed in conjunction with FIG. 5. In the discussion that follows, the word "control" refers to the current state of the state machine 600. Also, in FIG. 6, the symbol "*" stands for Boolean "AND," and "!" stands for Boolean "NOT." Whenever a cacheable branch instruction (e.g., non-delayed, partially non-delayed, etc.) has not been recently detected, control will remain in an idle state 602, as indicated by a state transition 604 back to the state 602 until a cacheable branch is detected. Note that the detection of cacheable branch instructions includes the ability to discriminate between cacheable and non-cacheable branch instructions. The state machine 600 accepts the early branch indication strobe on the line 508 and at substantially the same time receives at least a part of the branch instruction address on the line 510. This address information is compared against a set of resident branch cache tags. If the detected branch address matches a tag, then a branch cache hit is said to occur, and control is passed over a transition 606 from the idle state 602 to a cache hit state 608. The cache hit state 608 is serviced by a cache state machine shown in FIG. 9 and discussed below in connection with FIG. 9. When the branch instruction address does not match a branch cache tag, control is passed over a transition 610 to a state 612. In this situation, the information in a condition field 808 (see subsequent discussion of FIG. 8) may optionally be set to indicate the condition source of the branch instruction and to indicate whether the condition is early-resolvable or not. An early-resolvable condition is one which is available more than one clock before the associated conditional branch instruction. In accordance with the present invention, one branch cache entry can be eliminated if the branch is early-resolvable.

The state 612 performs several small tasks within a two-clock cycle period. The first function of the state 612 is to delay two clock cycles to allow the branch time to get to the execution stage 214 of the pipeline after its early detection. During this time interval, the branch cache may be given advanced notice to prepare for a possible new entry. At any time during these two cycles, if the branch condition, as stored in a register or as supplied by the first execute stage 214, evaluates to fall through, then control is passed from the state 612 over a transition 630 back to the idle state 602. In this case, the fall through addresses will be executed similarly to a delayed branch. No time penalty is incurred.

The state 612 may optionally include logic to speed up cache miss performance in instances where the target address points to an instruction already loaded in the pipeline. To deal with very short branches, the state 612 controls the latching of as many as three fetch packets immediately after the fetch packet containing the detected branch. This worst case condition occurs if the target fetch packet and the succeeding fetch packets are each processed in a single cycle, and if the target fetch packet is three fetch packets away from the fetch packet containing the branch instruction. If a cache miss is detected and the branch target is in one of the next three fetch packets, then one to three of the buffered packets are cached in the branch cache, and the program address generator 202 and the upper stages of the pipeline will stall while the short branch is serviced from the branch cache 500. When this happens, the short branching can proceed even though the pipeline appears to be stalled because the required fetch packets can be obtained from the branch cache 500. In this manner, even a cache miss will be accelerated, and subsequent short branches will result in branch cache hits and will be serviced according to the process described below.

The branch will be resolved no later than one clock cycle later, and, within two cycles, the branch target address will have been captured. If the target address is already in the pipeline, then "target in pipe" (TIP) processing may optionally be selected by taking a transition 614 from the state 612 to the state 616. In the state 616, the branch target address is adjusted from the address in the program address generator 202 to point to the address in the pipeline. If the transition 614 is selected, less than the entire pipeline delay of four cycles needs to be synchronized by the state 616. If the target is not in the pipe, or if optional TIP processing is not included in an embodiment, then the "target out of pipe" (TOP) path 618 is followed from the state 612 to a state 620. The state 620 inserts a three-cycle delay if the branch condition is early-resolvable, or a four-cycle delay if the branch condition is not early-resolvable. These delays compensate for the time it takes new instructions fill the pipe during the branch cache miss, thereby allowing fetched target instructions to propagate down the pipeline to the dispatch stage 210.

Once the target fetch packet makes it to the dispatch stage 210, the branch cache line fill begins. Control passes from either the state 616 or the state 620 along either a transition 622 or 624, respectively, to a state 626. The state 626 loads the target fetch packet into the branch cache 500 and decrements a counter d which has a value specified by the state 616 (d<4) or the state 620 (d=3 or d=4). The value of d is selected in accordance with one aspect of the present invention which involves caching a variable number of fetch packets during a branch cache miss. The number of cached fetch packets depends on the rate at which fetch packets are required in the target instruction stream. That is, in certain instances, one target fetch packet will pass through the pipeline per clock. In other instances, a target fetch packet will include several execute packets that each require one clock cycle to dispatch. In this case, the otherwise unused bandwidth in the prefetch stages can be used to fetch some or all of the remaining target fetch packets from the program cache as normal without incurring a time penalty.

The state machine 600 monitors the activity flag 506 which is strobed whenever a new fetch packet is strobed into a fetch packet buffer in the dispatch stage 210. Each transition into the state 626 decrements the counter d. If the activity flag 506 is strobed and the count d has not reached zero, then control is passed back to the state 626 which latches another fetch packet into the branch cache 500. If the activity flag 506 is not strobed and the count d has not reached zero, then control is passed to a state 628 which decrements the count d by one but which does not latch another fetch packet into the branch cache 500. Control will remain in the state 628, and the count d will be decremented by one on each clock cycle, but no fetch packets will be loaded into the branch cache until the activity flag 506 is strobed. If the activity flag 506 is strobed before the count d reaches zero, then control is passed back to the state 626 which latches another fetch packet into the branch cache 500.

When the counter d reaches zero, whether in the state 626 or in the state 628, control will be passed back to the idle state 602. This corresponds to the program fetch stages catching up to the dispatch stage 210. This functionality ensures that each branch cache tag will be associated with between one and four fetch packets. Note that moving the early branch detection into the dispatch stage 210 keeps the maximum number of cached fetch packets to four instead of five, although there are potentially five stages in the pipeline stall. This technique advantageously allocates the minimum number of fetch packet positions in the branch cache to insure that no delay slots are needed when a cache hit occurs, as discussed below.

Figure 7:
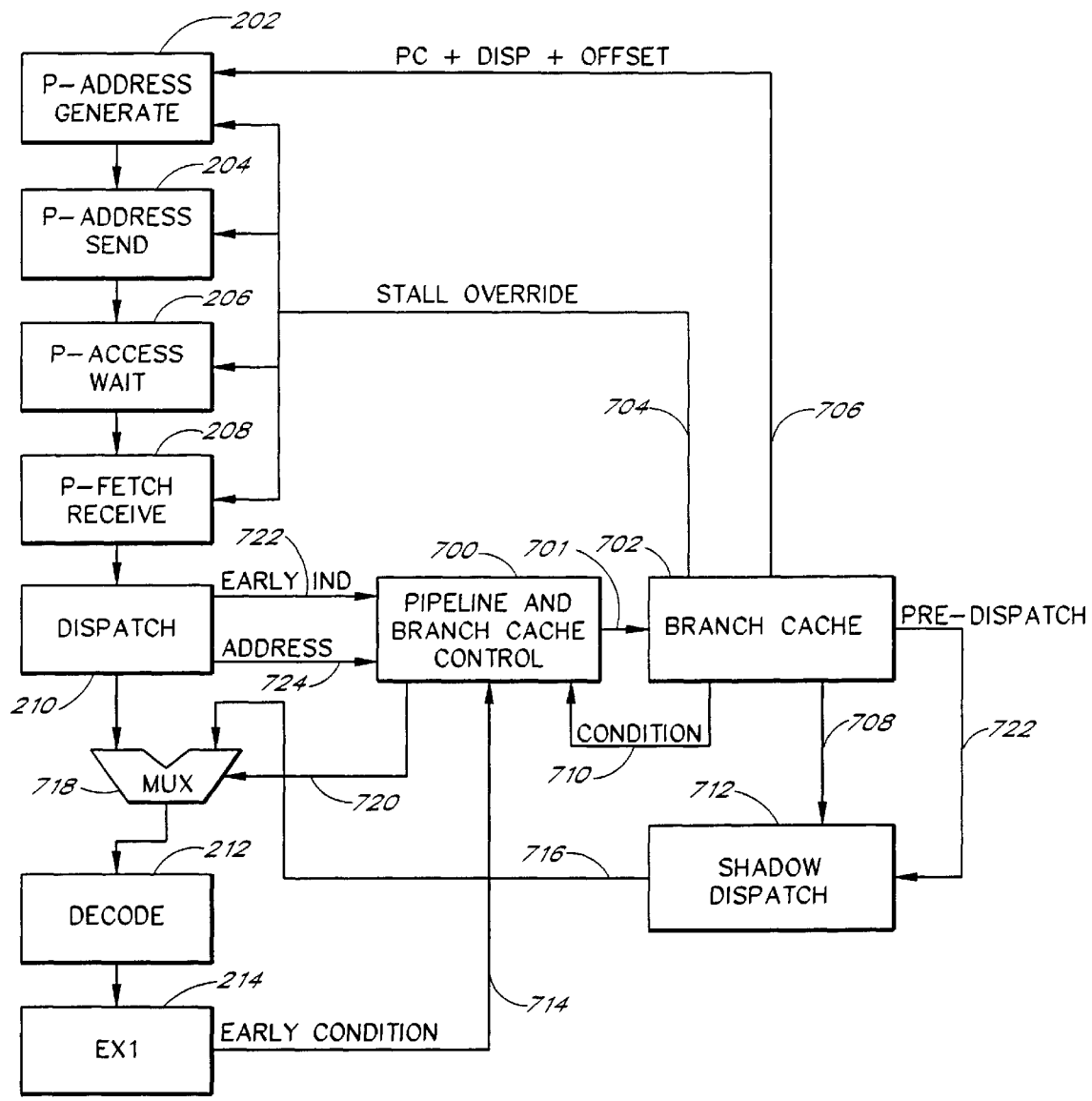
FIG. 7 is a block diagram that illustrates a structure of the pipeline, pipeline control logic, and a branch cache used to detect and respond to a branch cache hit.

FIG. 7 illustrates a preferred pipeline structure that supports branch cache hits. The embodiment of FIG. 7 reduces the effective number of cycles per branch from five cycles to one cycle (or even zero cycles) when an unpredictable branch instruction elects a target address. The first seven stages of the pipeline 200 (stages 202, 204, 206, 208, 210, 212, and 214) are again shown in FIG. 7. The program address generation stage 202 provides a program address to the program address send stage 204. The program address send stage 204 provides its output to the program access wait stage 206. The output of the program access wait stage 206 is a prefetch packet which is provided to the program fetch receive stage 208. The output of the program fetch receive stage 208 is a previous fetch packet which is provided to the dispatch stage 210. The dispatch stage 210 outputs a group of instructions from the fetch packet to a first input of a multiplexer 718. An output of the multiplexer 718 provides one of the instructions to the decode stage 212, which illustrates one exemplary pipeline in a system which can dispatch instructions to one or more such pipelines. The decode stage provides decoded instruction data to the first execute stage 214. The first execute stage 214 may provide output data to additional execute stages (not shown). The dispatch stage 210 provides an early branch indicator strobe (EARLY IND) 722 and target address data 724 to a pipeline and branch cache control stage 700. A multiplexer control output of the pipeline and branch cache control stage 700 is provided to a control input of the multiplexer 718. On processors with multiple decode units 212, each decode unit is provided with a multiplexer 718, and each multiplexer 718 is separately controlled by the pipeline and branch cache control stage 700. A cache data path 701 provides branch cache data from the pipeline and branch cache control stage 700 to a branch cache 702. The first execute stage 214 provides an early condition strobe 714 to the pipeline and branch cache control stage 700. The branch cache 702 provides a condition indicator 710 to the branch control stage 700. The branch cache 702 also provides a control signal 708 and a pre-dispatch signal 722 to a shadow dispatch block 712. The branch cache 702 also provides a stall override 704 to the pipeline stages 202, 204, 206, and 208. The branch cache 702 also provides a branch address (PC+DISP+OFFSET) 706 to the address generator stage 202.

The stall override 704 is used to override pipeline stalls when servicing branch cache hits to compensate for the delays inserted by the states 626 and 628 of the state machine 600. That is, the pipeline will be allowed to continue to load from the instruction cache if there is more than one execute packet in any of the first three target fetch packets. The branch cache 702 also outputs a target fetch address 706 to the program address generation stage 202. The target fetch address 706 allows prefetching to begin as soon as a conditional statement is resolved and the processor determines that a branch will be taken. The branch cache 702 also contains a field that is used to pass information over the line 710 back to the branch control stage 700 so that the control stage 700 can resolve the branch direction using information stored in a register or using information provided on the early condition line 714 from the stage 214 one cycle before the branch executes. When a branch cache hit occurs, the branch cache 702 will output a cached fetch packet on the line 708 to the shadow dispatch unit 712. Pre-dispatch information is optionally stored in the branch cache to simplify the shadow dispatch unit 712 and to allow instructions to be dispatched more rapidly. The multiplexer 718 is controlled by the branch control stage 700 to pass either the fall-through instructions or the target instructions to the decode stages after the branch has executed. Since the branch direction is resolved one cycle ahead of time, the multiplexer 718 can make a proper selection of the instruction to select after the branch. Also, since the branch target address is pre-computed, the branch instruction acts as a delay slot to allow the branch cache 706 the time it needs to look up the target instruction. The branch target address is fetched from the branch cache 706 before the branch is resolved, so that the branch target address is available by the time it is needed. Also, a target stream fetch address 802 (shown in FIG. 8) is supplied to the program address generation unit 202 so that the program address generation unit 202 immediately begins fetching from the appropriate location in the target instruction stream. With this hardware, an unpredictable data-dependent conditional branch requires only one cycle to execute instead of five. In some embodiments, if a single branch instruction is executed alone, the single cycle can be eliminated using branch folding as is known in the art. Like any other instruction, it can be executed in parallel with other instructions, further masking its effective computation time.

Figure 9:
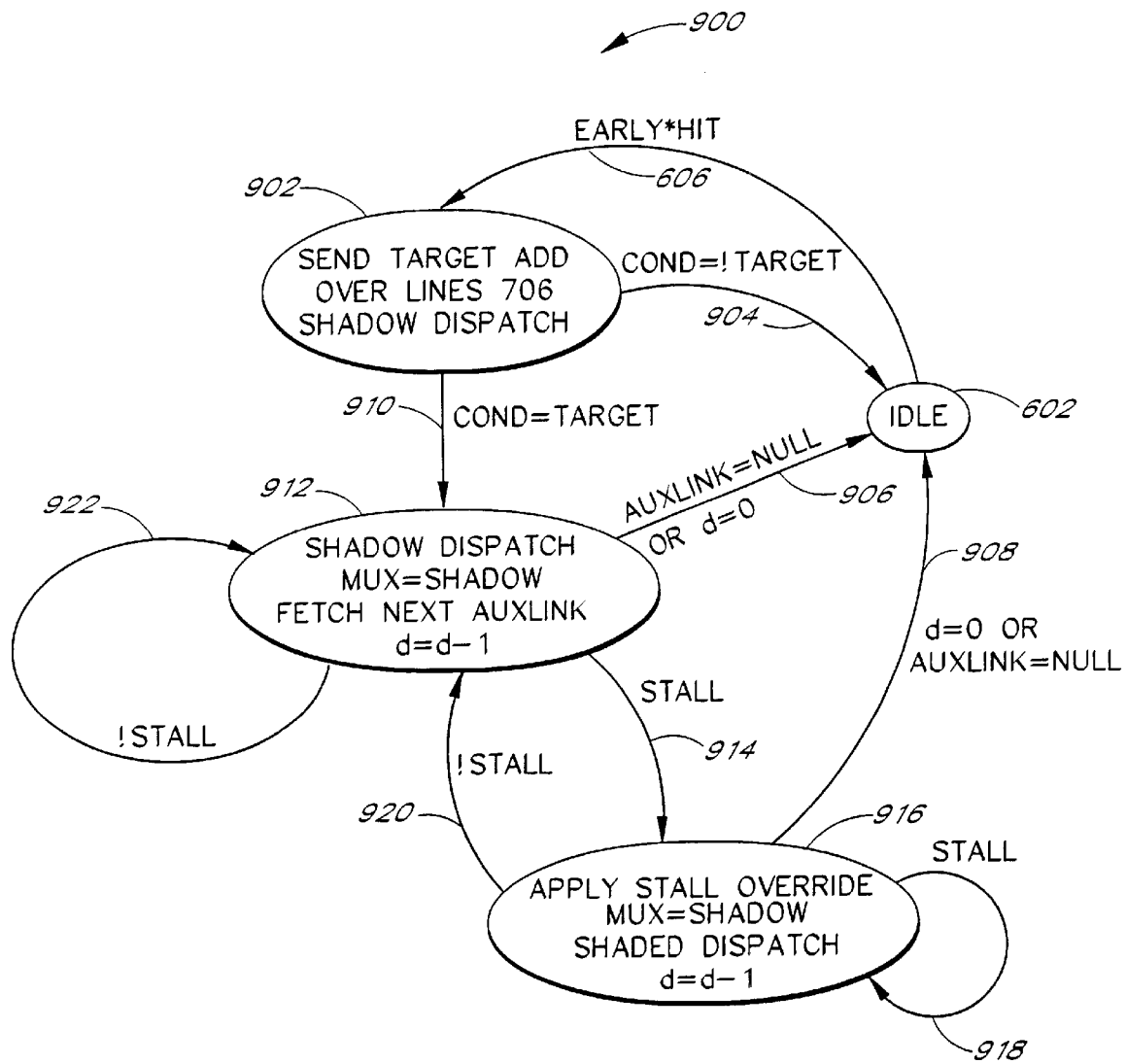
FIG. 9 is a state diagram that illustrates an embodiment of the sequential logic of the pipeline and branch cache control logic used to detect and respond to a branch cache hit.

The operation of the system in response to a branch cache hit can be fully understood by considering the branch cache hit state machine 900 shown in FIG. 9. The state machine 900 is a representative embodiment of the branch control stage 700. Before going into the details of the state machine, however, is helpful to first consider the structure of the branch cache 702.

Figure 8:
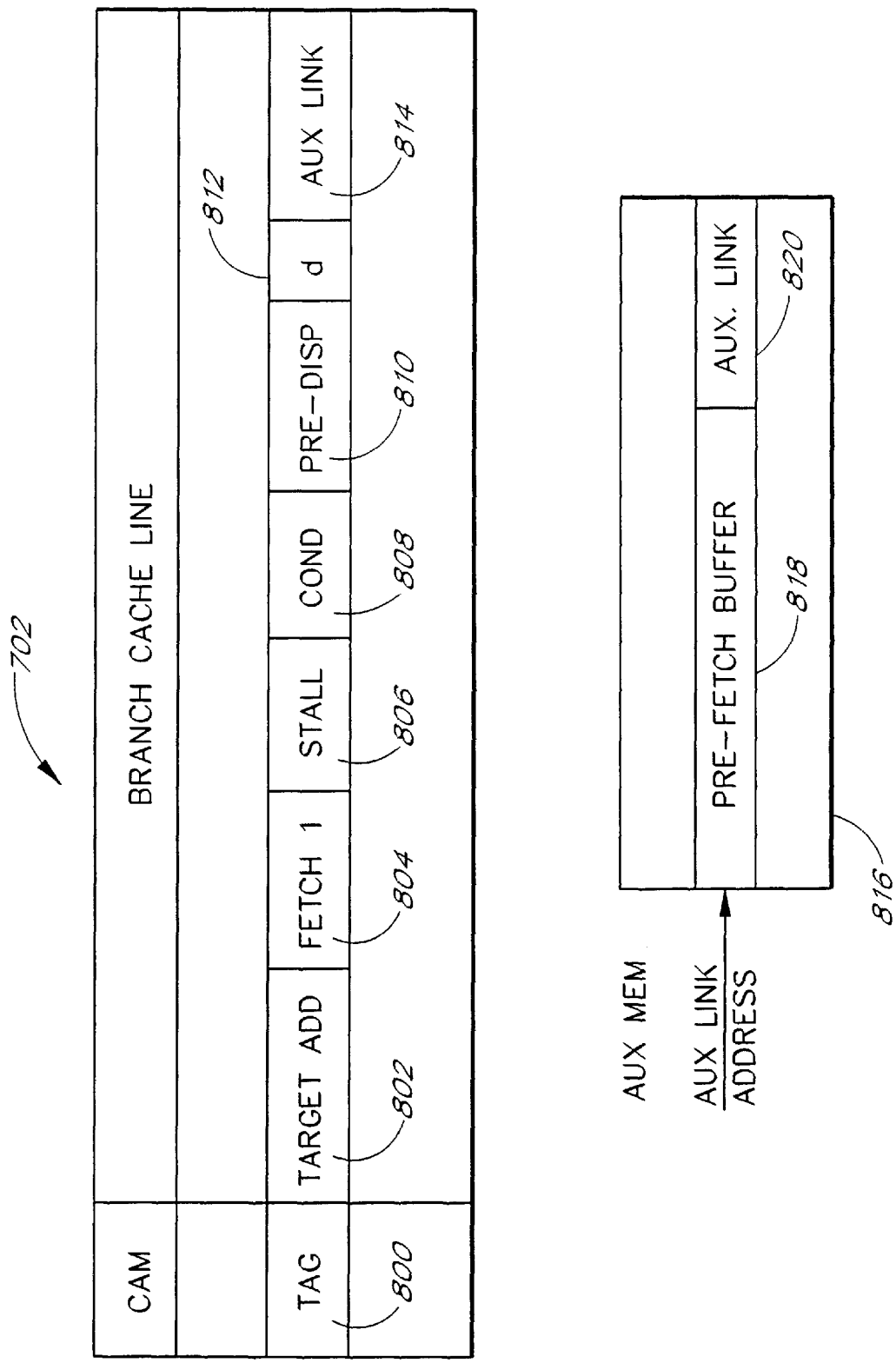
FIG. 8 is a block diagram that illustrates one embodiment of a branch cache structure.

FIG. 8 shows a representative example of the branch cache 702. The branch cache 702 has a tag field 800 in a content addressable memory (CAM) that holds a number of addresses of cached branch instructions. For example, in a preferred embodiment, a non-delayed conditional branch instruction address is simultaneously compared against all the tags in the branch cache. If there is a match, then the branch cache line associated with the matched tag is accessed. The branch cache line desirably contains multiple fields. For example, a first field (TARGET ADD) 802 contains an address to a selected point in the target instruction stream, this point being within four fetch packet addresses of the target instruction, computed to keep the fetching operation synchronized with the fetch packets supplied by the branch cache 702. A second field (FETCH 1) 804 contains a first fetch packet of a target instruction stream. A third field (STALL) 806 contains the stall override bits used to allow the pipeline to fill from the instruction cache using time created by having multiple execute packets contained in the fetch packets early in the target instruction stream.

An optional condition field (COND) 808 holds the register or pipeline address of the data that will be needed to resolve the conditional branch. The condition field 808 also indicates if the branch is early-resolvable. Early-resolvable conditions are evaluated once cycle earlier and thus can send the cached branch target address to the P-address generate stage 202 one cycle earlier. This reduces the worst case number of branch cache VLIW entries by one for early-resolvable branches. In many cases, the COND information will be contained directly in the branch instruction detected in the instruction stream, so that the COND information will be forwarded to the branch controller upon detection. An optional fifth field (PRE-DISP) 810 contains cached pre-dispatch information used by the shadow dispatch unit 712 to simplify its implementation and to speed its operation. An optional d-field 812 holds the count d of the number of delay slots that must be inserted by the branch cache. If short branches are not specifically supported, this number can be fixed to three, and the field can be deleted from the branch cache. An auxiliary link field (AUX LINK) 814 supplies an address into an auxiliary portion 816 of the branch cache that holds extra prefetch buffers 818 beyond the first one. The states 626 and 628 of FIG. 6 limit the number of cached prefetch registers to the smallest number required to keep full speed operation in the target instruction stream.

An additional auxiliary link field (AUX LINK) 820 is supplied in the auxiliary branch cache 816 to point to the next prefetch buffer address, if one exists. In a preferred embodiment, a null pointer is used to indicate that no more fetch packets are cached. This arrangement allows a smaller branch cache to service more branches by making use of data and other forms of dependencies that may exist in the program. Modifications to this structure can be made. For example, the auxiliary link fields 820 can be stored in the first cache line to improve performance.

FIG. 9 illustrates the state machine 900 which describes the operation of the branch cache control stage 700 during a cache hit. The state machine 900 corresponds to the state 608 in FIG. 6, and is connected to the state machine of FIG. 6 through the state 602 via the state transition 606. The state 602 and the state transition 606 shown in FIG. 6 are repeated in FIG. 9 for continuity and to show the linkage between the two state machines. Note that a set of transitions 904, 906 and 908 lead from the branch cache hit state machine 900 back to the idle state 602. The state machine 900 is best understood in the context of the apparatus shown in FIG. 7, as the state machine 900 illustrates the operation of the branch cache control stage 700 shown in FIG. 7.

A state 902 is entered from the idle state 602 when the dispatch stage 210 asserts the early branch address indicator (EARLY IND) on the line 722 and a match is found in the CAM 800 (i.e., HIT is active). Thus, EARLY*HIT will be true, and the branch cache 702 provides the target address 802 to the branch control stage 700. The branch control stage 700 uses the early indication signal 722 to qualify the branch address on line 724 and compares the address against all the tags 800 in the branch cache 702. When a match is detected, control passes along the transition 606 from the idle state 602 to the state 902 as indicated in FIG. 9. In the state 902, the branch cache is accessed, and the branch target address is supplied from the branch cache 702 to the program address generate stage 202 via the line 706, but is not latched until the branch is resolved. Also in the state 902, the branch cache 702 passes its fetch packet and optional pre-dispatch control signals along the lines 708 and 722 to the shadow dispatch unit 712. Also, in the state 902, the branch cache 702 sends condition information to the branch control logic 700 so that the branch control stage 700 can check the appropriate branch condition as soon as it becomes available in the execute stage 214 during the following clock cycle. If the condition evaluates to the fall-through value, then a transition 904 is followed from the state 902 back to the idle state 602, and the process is aborted because no branch is taken. If the condition evaluates to the target, control follows along a transition 910 to a state 912. Note that in the state 912, the state machine 900 is one cycle ahead of the branch instruction. That is, the state machine 900 takes action while the branch moves from the decode stage 212 to the first execute stage 214. In the state 912, the state machine 900 knows that the packet in the dispatch stage 210 contains instructions that will be invalidated in the empty delay slots behind the branch. These are the instructions that need to be flushed from the pipeline. Since the target instructions are available in the shadow dispatch unit 712, the state 912 asserts the multiplexer control signal 720 of multiplexer 718 to provide the output of the shadow dispatch unit 712 to the decode stage 212. The state 912 also asserts a multiplexer signal (not shown) to route the branch target address data on line 706 into the program address generate stage 202.

Finally, in the state 912, the count value d, which indicates the number of cycles the branch cache must service, is decremented by one.

There are several possible ways to transition out of the state 912. A first transition 906 from the state 912 back the idle state 602 may be selected when the counter d reaches zero. This transition may optionally be selected when the auxiliary link 814 is equal to zero to allow early termination for close branch situations (e.g., target in pipe (TIP) processing). If neither of these two end conditions are satisfied, then the stall override bits are checked. If there is no stall due to multiple execute packets being dispatched per fetch packet, control transitions from the state 912 back to the state 912 (a loop) and the next fetch packet is supplied to the shadow dispatch unit 712 and is subsequently dispatched. Also, the multiplexer 718 is set as described above, and the counter d is once again decremented. If a stall override condition does occur, then control is passed from the state 912 to a state 916 over a transition 914. While the next execute packets are dispatched from the same fetch packet stored in the shadow dispatch unit 712, the stall override signal is applied to the first four pipeline stages 202, 204, 206 and 208, which continue to fetch target fetch packets to fill the pipeline from the instruction cache instead of the branch cache 702. This minimizes the number of fetch packets stored in the branch cache 702. Control transitions back to the state 916 over a transition 918 until the counter d reaches zero or an optional auxiliary link 804 is equal to zero. When either of these conditions occur, control is passed back to the state 602 over the transition 908. If the stall override condition terminates in the state 916, then control passes back to the state 912 via a transition 920.

Although the present invention has been described with reference to a specific embodiment, other embodiments may occur to those skilled in the art without deviating from the intended scope. For example, in FIG. 5, the cache line fill coming from the program-fetch receive stage 208 on line 500 can be moved to the dispatch stage 210 or to the decode stage 212. The early branch indication logic 408, preferably implemented in the dispatch stage, can be moved to any one of the other stages. Hence, configurations can be provided which have an effective branch-hit instruction cycle-time of zero cycles. The branch instruction address can also be supplied by the branch cache to the various other stages. The present invention can also be applied to processors with pipeline structures different than the one illustrated in the preferred embodiment. In yet another embodiment, the bits in the branch instruction can be dedicated to convey TIP (i.e., target in pipe) information to the control logic 504. These bits are similar to the concept of partially non-delayed branches. Also, branch addresses may be monitored by the control logic 504 so that the dispatch unit 210 does not drive the address on the line 510 but only provides the displacement into the fetch packet. Different state machines can be used to implement the control logic described in FIG. 6 and FIG. 9. Numerous other arrangements may be designed by those skilled in the art without departing from the scope of the present invention.

It is to be understood therefore, that the invention herein encompasses all such embodiments that do not depart from the spirit and scope of the invention as defined in the appended claims.

What is claimed is:

1. In a processing apparatus which fetches groups of instructions in fetch packets and dispatches one or more subsets thereof as execute packets in one or more clock cycles, a method comprising:

caching the contents of a target prefetch buffer when a branch cache miss is detected; and caching the contents of a variable number of immediately following prefetch buffers, the number of prefetched buffers whose contents are cached being the number of prefetch buffers whose contents are fetched in a target instruction stream during the first d cycles of execution, where the number d is related to the number of pipeline stages that would otherwise stall when a branch to the target instruction stream occurs.

2. The method of claim 1, whereby the number d is related to the number of execute packets stored in one or more cached fetch packets located in the target instruction stream.

3. The method of claim 1, further comprising reducing the number d if at least one instruction from the target instruction stream is expected to be already fetched into the pipeline at the time of a branch cache hit to said target instruction stream.

4. A processing apparatus which fetches groups of instructions in fetch packets and dispatches one or more subsets thereof as execute packets in one or more clock cycles, comprising:

a branch cache that stores the contents of a target prefetch buffer when a branch cache miss is detected; and a control unit that causes the contents of a variable number of immediately following prefetch buffers to also be cached in said branch cache, the number of prefetched buffers whose contents are cached being the number of prefetch buffers whose contents are fetched in a target instruction stream during the first d cycles of execution, where the number d is related to the number of pipeline stages that would otherwise stall when a branch occurs.

5. The processing apparatus of claim 4, whereby said processing apparatus is a VLIW processor.

6. The processing apparatus of claim 4, whereby said processing apparatus is a superscalar processor.

7. A computerized system, comprising:

a processor, whereby said processor fetches groups of instructions in fetch packets and dispatches one or more subsets thereof as execute packets in one or more clock cycles, said processor comprising:

a branch cache that stores the contents of a target prefetch buffer when a branch cache miss is detected;

a control unit that causes the contents of a variable number of immediately following prefetch buffers to also be cached in said branch cache, the number of prefetched buffers whose contents are cached being the number of prefetch buffers whose contents are fetched in a target instruction stream during the first d cycles of execution, where the number d is related to the number of pipeline stages that would otherwise stall when a branch occurs.

8. The computerized system of claim 7, whereby said processor is a VLIW processor.

9. The computerized system of claim 7, whereby said processor is a superscalar processor.

10. The computerized system of claim 7, whereby the number d is related to the number of execute packets stored in one or more cached fetch packets located in the target instruction stream.

11. The computerized system of claim 7, whereby the number d is reduced if at least one instruction from the target instruction stream is expected to be already fetched into the pipeline at the time of a branch cache hit to said target instruction stream.

12. A processing apparatus comprising:

an instruction pipeline comprising a plurality of stages;

a branch cache module to which d fetch packets are stored from d of said pipeline stages; and a branch cache control unit that causes said branch cache module to store said fetch packets from said d of said pipeline stages in response to execution of a cacheable branch instruction which triggers a cache miss, and when a cache hit occurs, causes said branch cache module to restore data relating to said d of said fetch packets to said pipeline, thereby avoiding pipeline stalls;

whereby the number d is related to the number of execute packets stored in one or more cached fetch packets.

13. A processing apparatus comprising:

an instruction pipeline comprising a plurality of stages, each stage initially containing first data;

branch cache module that stores at least a portion of said first data from one or more of said pipeline stages; and a branch cache control unit that causes said branch cache module to store said at least portion of said first data from one or more of said pipeline stages in response to execution of a cacheable branch instruction which triggers a cache miss, and causes said branch cache module to restore second data to one or more of said pipeline stages in response to a cache hit, thereby avoiding pipeline stalls when a cache hit occurs;

whereby said branch cache control unit receives an early indication from said instruction pipeline prior to the execution of said branch instruction.

14. The processing apparatus of claim 13, whereby said branch cache control unit receives said early indication from said instruction pipeline prior to the decoding of said branch instruction.

15. A processing apparatus comprising:

a processing pipeline comprising a plurality of pipeline stages to include at least a prefetch stage, a decode stage, and an execute stage;

a branch cache clntrol unit, said branch cache control unit receiving an early indication of the presence of a branch instruction in said pipeline, said early indication being received prior to said branch instruction propagating to said execute stage;

a dispatch unit; and a shadow dispatch unit;

whereby said shadow dispatch unit is operative to dispatch at least one branch target instruction.

16. The processing apparatus of claim 15, whereby said first data and said second data comprise the same data.

a branch cache control unit, said branch cache control unit receiving an early indication of the presence of a branch instruction in said pipeline, said early indication being received prior to said branch instruction propagating to said execute stage;

a dispatch unit; and a shadow dispatch unit;

whereby said shadow dispatch unit is operative to dispatch at least one branch target instruction.

17. The processing apparatus of claim 15, whereby said dispatch unit is operative to dispatch at least one fall-through instruction.

18. The processing apparatus of claim 15, further comprising:

a multiplexer, said multiplexer comprising a first input coupling coupled to receive the output of said dispatch unit, a second input coupling coupled to receive the output of said shadow dispatch unit, and an output coupling coupled to selectively deliver one or more instructions to said decode stage.

19. In a processor comprising a computational pipeline having a plurality of pipeline stages and a branch cache, a method of controlling said branch cache, comprising:
providing an indication to a branch cache controller when a branch instruction is detected in a selected one of said pipeline stages;
evaluating the branch target address of said branch instruction;
determining whether at least one instruction residing at said branch target address has already been fetched into said computational pipeline; and
selecting a number of fetch packets (d) to be transferred to or from the branch cache based at least partially on the result of the act of determining.

20. The method of claim 19, further comprising determining the number of fetch packets (d) based at least partially on the number of execute packets in the fetch packet corresponding to said branch target address.

21. The method of 19, further comprising reducing the number d if at least one instruction from the target instruction stream is expected to be already fetched into the pipeline at the time of a branch cache hit to said target instruction stream.

22. In a pipelined processor, a method for reducing pipeline stalls caused by branching, comprising:
prefetching instructions into a first stage of said pipeline;
propagating instructions into one or more subsequent stages of said pipeline;
concurrently with processing at a specified stage in said pipeline, analyzing one or more instruction op-codes to determine whether a branch instruction is present, and if so, its branch instruction type;
if at least one non-delayed branch instruction is detected, performing branch cache processing; and
if no branch instruction is detected or if all detected branch instructions correspond to delayed branch instructions, not performing branch cache processing.

23. The method of claim 22, further comprising:
if a partially-delayed branch instruction is detected, performing a reduced form of branch cache processing.

24. The method of claim 22, whereby said branch cache processing further comprises:
analyzing a tag field associated with said detected branch instruction;
if said tag matches a tag stored in a branch cache tag memory, performing a branch cache hit sequence; and
if said tag does not match a tag stored in a branch cache tag memory, performing a branch cache miss sequence.

25. The method of claim 22, whereby said pipeline includes a dispatch stage, and said branch cache hit sequence comprises:
reading specified contents of said branch cache into a shadow dispatch unit, said specified contents associated with said tag; and
dispatching at least one instruction from said shadow dispatch unit to a pipeline stage that succeeds said dispatch pipeline stage.

26. The method of claim 22, whereby said branch cache miss sequence comprises:
delaying a number of cycles to allow one or more branch target instructions to propagate into said specified pipeline stage; and
concurrently with pipeline processing of said one or more branch target instructions, loading said one or more branch target instructions into said branch cache;
whereby the number of branch target instructions loaded into said branch cache is related to the number of execute packets in at least one fetch packet corresponding to said one or more branch target instructions.

27. The method of claim 22, whereby said specified stage corresponds to an instruction dispatch stage, thereby providing an early branch instruction detection relative to the decoding and execution of said branch instruction.

28. In a pipelined processor including both cacheable branch instructions and non-cacheable branch instructions, a method for reducing pipeline stalls caused by branching, comprising:
prefetching instructions into a first stage of said pipeline;
propagating instructions into one or more subsequent stages of said pipeline;
concurrently with processing at a specified stage in said pipeline, analyzing one or more instruction op-codes to determine whether a cacheable branch instruction is present, and, only if said cacheable branch instruction is present, sending a tag relating to said branch instruction to a branch cache.

29. The method of claim 28, whereby said specified stage corresponds to an instruction dispatch stage, thereby providing an early branch instruction detection relative to the decoding and execution of said branch instruction.

30. The method of claim 28, whereby said specified stage corresponds to the a pipeline stage that precedes an instruction decode pipeline stage, thereby providing an early branch instruction detection relative to the decoding and execution of said branch instruction.

31. The method of claim 28, whereby said specified stage corresponds to a pipeline stage that precedes an instruction execute pipeline stage, thereby providing an early branch instruction detection relative to the execution of said branch instruction.

32. A computer processor comprising:
an instruction pipeline comprising a plurality of stages, each stage containing pipeline data;
a branch cache comprising a plurality of cache lines, each cache line comprising a branch tag field and cache data field; and
a branch cache controller configured to:
detect a cacheable branch instruction in one of said pipeline stages;
receive a current branch tag from one of said pipeline stages;
receive conditional information indicative of whether the branch shall be taken;
attempt to match said current branch tag to a stored branch tag for a first cache line;
if said branch is to be taken, signal a cache miss when said attempt to match fails;
if said branch is to be taken, signal a cache hit when said attempt to match succeeds;
in response to said cache miss, store said current branch tag, in said branch tag field of a designated cache line and store in said cache data field of said designated cache line data from one or more of said pipeline stages which stall in response to said cacheable branch instruction after said one or more pipeline stages have been filled with data starting at a branch target address; and
in response to said cache hit, load said one or more pipeline stages from said cache data field to avoid a pipeline stall from said cacheable branch instruction.

33. In a pipelined microsystem such as a microprocessor, DSP, media processor, or microcontroller, a method to load branch instruction information into a branch cache so as to allow the branch instruction to execute subsequently with a reduced or eliminated time penalty by minimizing the amount of information to be cached, the method comprising:

monitoring the instruction stream in a dispatch unit in a pipeline stage to detect whether a branch instruction of a selected type is present;

when said branch instruction is detected:

signaling to a branch cache control unit that the branch instruction is present;

making available at least a function of branch target address to said branch cache control unit;

comparing said function of said address of said branch instruction to a set of cache tags containing branch instruction address related information;

when said branch instruction does not match any tag, writing a line into said branch cache so that when said branch instruction is next encountered, the tag will match and the branch target stream can proceed without delay; and when program execution makes a branch target fetch packet available to be cached, thereby allowing the target instruction stream to execute to a target prefetch buffer, performing:

loading data from said branch target prefetch buffer into a position in the branch cache associated with said branch instruction;

setting a counter to a prespecified number, d, corresponding to the number of fetch packets that need to be cached to prevent a pipeline stall in a subsequent branch cache hit associated with said branch target address;

decrementing the counter on each subsequent cycle;

loading subsequent fetch packets from the target instruction stream into the branch cache; and exiting the branch cache fill operation when the counter has decremented to a specified number such that the branch cache contains the appropriate number of target prefetch packets that are fetched in the first d time slots when the target instruction stream is executed.

34. The method of claim 33, whereby the number, d, is related to the number of separate execute packets contained in one or more fetch packets stored at said branch target address.

35. The method of claim 33, whereby the number, d, is related to a condition that identifies that a fetch packet corresponding to the branch target address will already present within the pipeline at the time of an upcoming branch cache hit associated with said branch target address.

36. In a pipelined microsystem such as a microprocessor, DSP, media processor, or microcontroller, a method to service branch cache hits so as to reduce or eliminate cycle loss due to branching, said method comprising:

reading the contents of a target prefetch buffer out of the branch cache and supplying said contents of said target prefetch buffer to a shadow dispatch unit;

dispatching said prefetch buffer contents from said shadow dispatch unit to a multiple execution pipeline in units of execute packets.

37. The method of claim 36, further comprising:

prefetching instructions at a full prefetch rate, irrespective of whether multiple cycles are required to dispatch a fetch packet, until early pipeline stages catch up to later pipeline stages, whereby the target instruction stream proceeds at full speed and only a minimum number of fetch packets needed to support full speed execution are fetched from the branch cache.

38. In a pipelined microsystem such as a microprocessor, DSP, media processor, or microcontroller, a method for servicing branch cache hits so as to reduce or eliminate cycle loss due to branching, said method comprising:

reading the target prefetch buffer out of the branch cache;

supplying the contents of the target prefetch buffer to a multiplexer which routes the contents of the target prefetch buffer back to a dispatch unit;

dispatching the contents of the target prefetch buffer from said dispatch unit to said pipeline in units of execute packets;

prefetching instructions by said pipeline at full speed, irrespective of whether it takes multiple cycles to dispatch a fetch packet, until the early pipeline stages catch up to the later pipeline stages, whereby the target instruction stream proceeds at nearly full speed, and only a minimum number of fetch packets needed to support full speed execution are fetched from the branch cache.

39. A method to fill an instruction pipeline after a branch instruction is detected which selects a target instruction stream, the method comprising:

reading the contents of a prefetch buffer out of a branch cache line associated with the instruction which caused the branch cache hit, said contents comprising at least one fetch packet;

sending the contents of the prefetch buffer to a shadow dispatch unit;

routing the output of the shadow dispatch unit to one or more decoder stages of an execution pipeline in units of execute packets; and subsequently supplying one or more fetch packets from the branch cache to allow the target instruction stream to proceed without adding extra delay cycles.

40. A processing apparatus comprising:

an instruction pipeline comprising a plurality of pipeline stages to include at least a prefetch stage, a dispatch stage, a decode stage and an execute stage;

a branch cache control unit responsive to an early indication signal and at least a function of a branch target address coupled from a pipeline stage that precedes said execute stage;

a branch cache that stores one or more branch target fetch packets in support of said branch target address;

a coupling from said execute stage to said branch cache control unit, said coupling being capable of carrying a signal indicative of whether a branch condition evaluated to the affirmative or the negative;

whereby said branch cache control unit causes at least one branch target fetch packet to be preemptively read from said branch cache prior to receiving said signal from said execute stage.

41. The processing apparatus of claim 40, further comprising a shadow dispatch unit, whereby said branch target fetch packet is preemptively read from said branch cache into said shadow dispatch unit.

42. The processing apparatus of claim 41, whereby when said control signal evaluates affirmatively, the shadow dispatch unit dispatches branch target instructions to said decode stage, thereby avoiding a pipeline stall.

43. The processing apparatus of claim 42, whereby upon said affirmative indication, said prefetch stage begins fetching instructions from the branch target address plus a displacement, so that the pipeline may resume normal instruction stream fetching for said branch target instruction stream, thereby avoiding a pipeline stall and minimizing the number of branch target instructions that must be stored in said branch cache.

44. The processing apparatus of claim 41, whereby the number of branch target fetch packets stored in said branch cache is a function of the number of separate execute packets located in at least one of said branch target fetch packets to support a cache hit from said branch target address.

45. A processing apparatus which fetches groups of instructions in fetch packets and dispatches one or more subsets thereof as execute packets in one or more clock cycles, comprising:

means for caching data, said means for caching being adapted to store the contents of a target prefetch buffer means when a miss in said means for caching is detected; and means for controlling, said means for controlling being configured to cause the contents of a variable number of immediately following prefetch buffer means to also be cached in said means for caching, the number of prefetched buffer means whose contents are cached being the number of prefetch buffer means whose contents are fetched in a target instruction stream during the first d cycles of execution, where the number d is related to the number of pipeline stages that would otherwise stall when a branch occurs.

46. A processing apparatus comprising:

instruction pipeline means comprising a plurality of stages, each stage initially containing first data;

means for storing at least a portion of said first data from one or more of said pipeline means stages; and control means that causes said means for storing to store said at least portion of said first data from one or more of said stages of said pipeline means in response to execution of a storable branch instruction which triggers a miss of said means for storing, and causes said control means to restore second data to one or more of said stages in response to a hit, thereby avoiding pipeline stalls when a hit of said means for storing occurs;

whereby said control means receives an early indication from said instruction pipeline means prior to the execution of said branch instruction.

47. In a processor comprising a computational pipeline having a plurality of pipeline stages and a branch cache, a method of controlling said branch cache, comprising the steps of:

monitoring a selected one of said pipeline stages for detecting when a branch instruction is present and for providing an indication to a branch cache controller when said branch instruction is detected;

evaluating the branch target address of said branch instruction for determining whether at least one instruction residing at said branch target address has already been fetched into said computational pipeline; and selecting a number of fetch packets (d) to be transferred to or from the branch cache based at least partially on the result of the act of determining.

48. A computerized system, comprising:

means for processing data, said means for processing comprising:

instruction pipeline means comprising a plurality of stages;

means for caching first data from one or more of said pipeline stages and providing second data to one or more of said pipeline stages; and means for controlling said means for caching that causes said means for caching to store said first data from one or more of said pipeline stages in response to execution of a cacheable branch instruction which triggers a miss of said means for caching, and causes said means for caching to provide second data to one or more of said pipeline stages in response to a hit of said means for caching, thereby avoiding pipeline stalls when such a hit occurs;

whereby said means for controlling receives an early indication from said instruction pipeline means prior to the execution of said branch instruction.

* * * * *

UNITED STATES PATENT AND TRADEMARK OFFICE
CERTIFICATE OF CORRECTION

PATENT NO. : 6,647,467 B1
DATED : November 11, 2003
INVENTOR(S) : Eric M. Dowling It is certified that error appears in the above-identified patent and that said Letters Patent is hereby corrected as shown below:

Column 2,
Lines 14-15, "control stalls remain more of a problem, especially in modem superscalar and VLIW systems with long pipelines." should read -- control stalls remain more of a problem, especially in modern superscalar and VLIW systems with long pipelines. --
Lines 53-63, "modem piplines that execute one instruction per clock cycle because this approach relies on the fact that the execution unit is a microprogrammed state machine and requires multiple clock cycles to execute instructions. The lag time provided by multi-cycle operation allows the prefetch unit and the instruction decoder ample time to concurrently process more than one instruction stream. Modem processors include multiple pipelined execution units that operate at substantially the same speed as the prefetch unit and decoder. Hence, this technique is not applicable to modem systems." should read -- modern piplines that execute one instruction per clock cycle because this approach relies on the fact that the execution unit is a microprogrammed state machine and requires multiple clock cycles to execute instructions. The lag time provided by multi-cycle operation allows the prefetch unit and the instruction decoder ample time to concurrently process more than one instruction stream. Modern processors include multiple pipelined execution units that operate at substantially the same speed as the prefetch unit and decoder. Hence, this technique is not applicable to modern systems. --

Column 20,
Lines 40-44, "a branch cache clntrol unit, said branch cache control unit receiving an early indication of the presence of a branch instruction in said pipeline, said early indication being received prior to said branch instruction propagating to said execute stage;" should read -- a branch cache control unit, said branch cache control unit receiving an early indication of the presence of a branch instruction in said pipeline, said early indication being received prior to said branch instruction propagating to said execute stage; --

UNITED STATES PATENT AND TRADEMARK OFFICE
CERTIFICATE OF CORRECTION

PATENT NO. : 6,647,467 B1
DATED : November 11, 2003
INVENTOR(S) : Eric M. Dowling It is certified that error appears in the above-identified patent and that said Letters Patent is hereby corrected as shown below:

Column 20 (cont'd),
Lines 50-60, "The processing apparatus of claim 15, whereby said first data and said second data comprise the same data.
a branch cache control unit, said branch cache control unit receiving an early indication of the presence of a branch instruction in said pipeline, said early indication being received prior to said branch instruction propagating to said execute stage;
a dispatch unit; and
a shadow dispatch unit;
whereby said shadow dispatch unit is operative to dispatch at least one branch target instruction." should read -- The processing apparatus of claim 15, whereby said first data and said second data comprise the same data. --

Signed and Sealed this

Thirtieth Day of March, 2004

JON W. DUDAS
*Acting Director of the United States Patent and Trademark Office*